United States Patent Office 3,266,131
Patented August 16, 1966

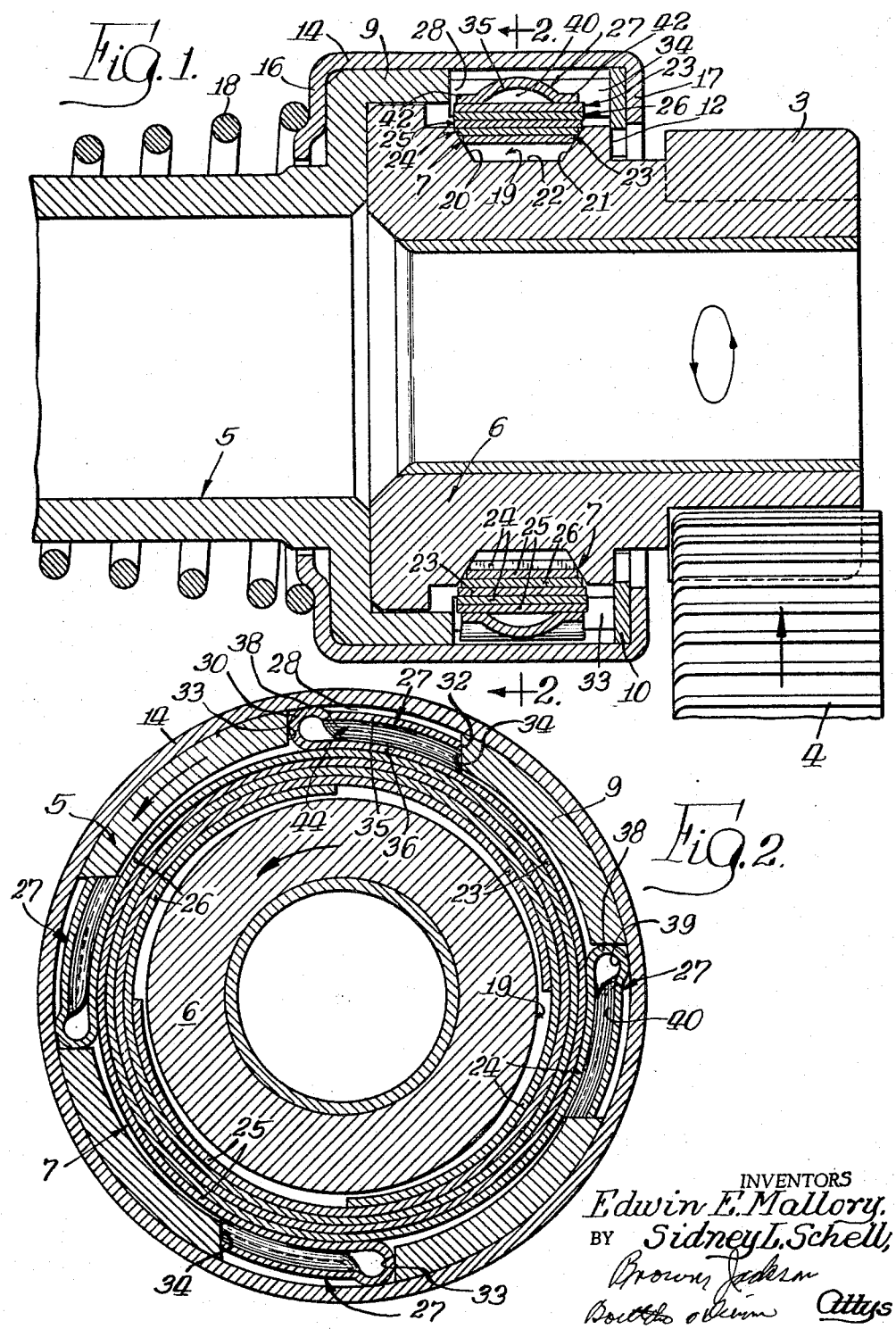

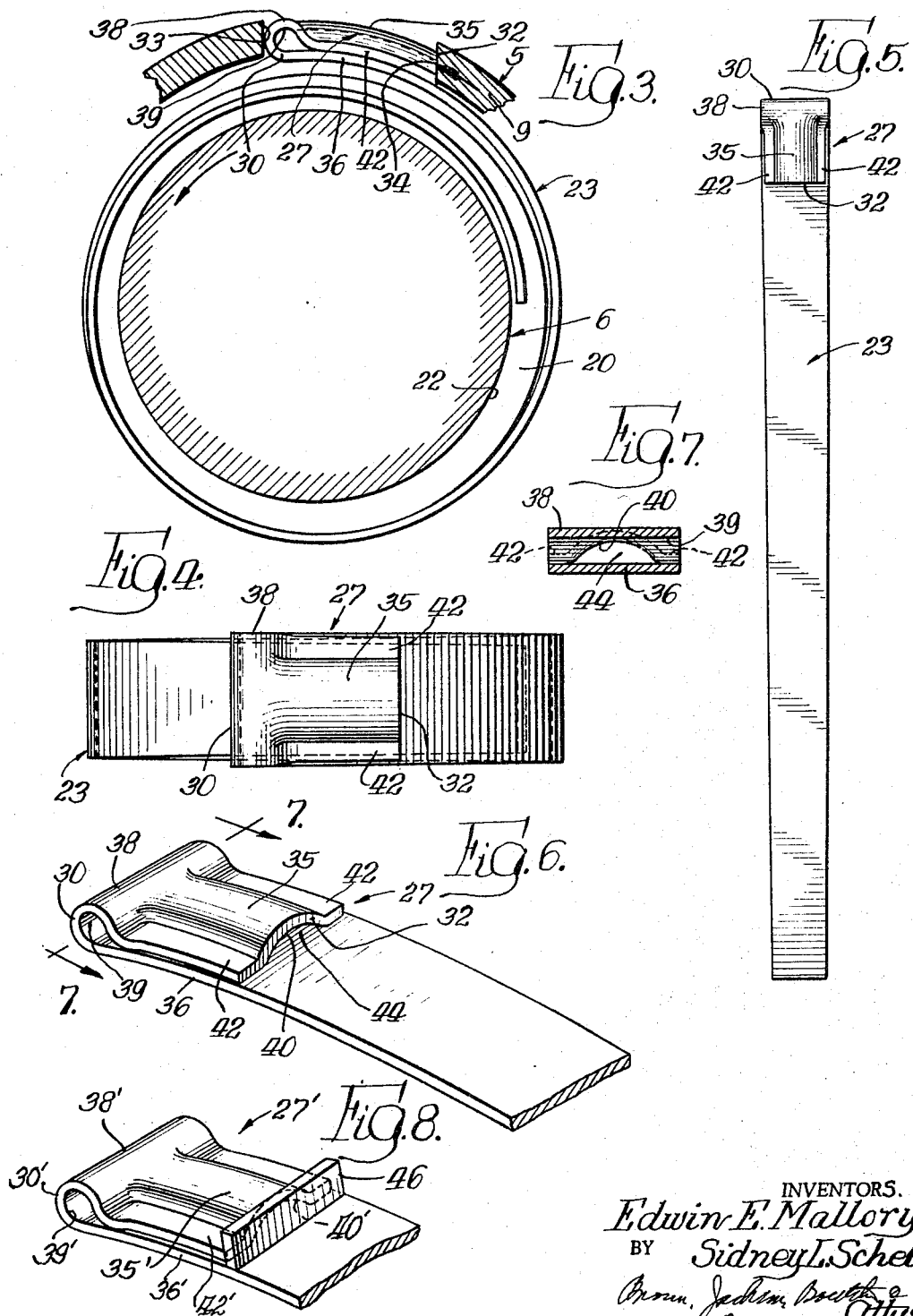

3,266,131
METHOD OF MAKING A CLUTCH BAND
Edwin E. Mallory, Niles, Mich., and Sidney L. Schell, South Bend, Ind.; said Mallory assignor to National-Standard Company, Niles, Mich., a corporation of Delaware, and said Schell assignor to John M. Dodwell, Buchanan, Mich.
Filed May 22, 1964, Ser. No. 369,419
3 Claims. (Cl. 29—173)

The present application is a continuation-in-part of our application Serial No. 328,533 filed December 6, 1963, now abandoned, and relates to clutch bands and method of making same.

In United States Patent No. 2,518,453 issued August 15, 1950, to John M. Dodwell, there is disclosed a band type free wheeling clutch embodying drive and driven clutch members, one of which is provided with a V-groove in which band means is disposed, and in which one end of such band means is fixed to the other of such clutch members. The arrangement is such that upon rotation of the drive member in one direction the driven member is driven in the same direction through engagement of the side edges of the band means with the side walls of the V-groove, and which, when the driven member rotates at a faster speed than the drive member, the band means permits the driven member to overrun the drive member.

Considerable difficulty has been encountered in making commercially acceptable clutches of the aforementioned type. One major problem has resided in providing a satisfactory band means and especially an adequate anchor for the fixed or secured end of the band means. In the prior art, various structural arrangements are disclosed for fixing one end of the band means fast to one of the clutch parts, but such known structures, when subject to testing, fail by fracturing of the metal adjacent the fixed end before a minimum number of clutching operations required to render them satisfactory for use can be completed. It has also been proposed in an attempt to avoid such fracturing of the secured end of the band to work the metal at a terminal end of the clutch band to form an anchor and dispose the same in a pocket like opening in one of the clutch parts so as not to be directly secured thereto as by pinning or the like, but in such known arrangements the worked metal is of reduced thickness of inadequate mechanical strength to take the clutching load, and further upon wear of the clutch bands so that they extend deeper into the V-groove of the other clutch part, the driving and releasing faces of the anchor end of the clutch band fail to maintain necessary engagement with end walls of the pocket for effecting engagement and disengagement of the clutch.

It is an object of the present invention to provide a method of making a clutch band which is not subject to the aforementioned deficiencies of the prior art, by providing clutch band means in which an end anchor is provided by folding a portion of the metal at a terminal end of a band back upon itself without reducing the thickness of the folded over metal, and in such folding provide driving and releasing faces of substantial height so as to retain engaging relation of such faces with driving and releasing faces of one of the clutch parts even after substantial wear of the band means.

Further, the anchor ends of the prior art have portions of different thicknesses which are difficult to heat treat uniformly, and additionally, in certain instances such portions are so disposed with respect to each other that they cannot be quenched uniformly and by reason of either or both of such factors the resulting clutch bands are unsatisfactory.

Accordingly, it is a further object of the invention to provide a method of making a clutch band having an anchor formed by an outer end portion disposed in superimposed relation to an adjacent inner portion connected by a fold and in which the outer and inner portions and the fold are of substantially the same thickness of metal.

A further object is to provide a method of making a clutch band as last noted in which the outer and inner end portions and the fold provide passages therebetween to enable uniform heat treating and quenching of the anchor end of the spring clutch band.

The above and other objects and advantages of the invention will be apparent from the following detailed description of certain preferred embodiments of the invention.

Now in order to acquaint those skilled in the art with the manner of constructing and utilizing clutch bands in accordance with the present invention, certain preferred embodiments of the invention will be described in conjunction with the drawings.

In the drawings:
FIGURE 1 is a vertical sectional view through a clutch embodying clutch bands of the present invention;
FIGURE 2 is a detail vertical sectional view taken substantially on the line 2—2 of FIGURE 1 looking in the direction indicated by the arrows;
FIGURE 3 is an end elevational view of one of the clutch bands of the present invention shown in relation to drive and driven members of a clutch;
FIGURE 4 is a plan view of the clutch band of FIGURE 3;
FIGURE 5 is a plan view of the clutch band of FIGURE 4 prior to forming of the band into a generally spiral configuration;
FIGURE 6 is an enlarged perspective view of the anchor end of the clutch band of FIGURES 4 and 5;
FIGURE 7 is a detail transverse sectional view taken substantially along the line 7—7 of FIGURE 6 looking in a direction indicated by the arrows;
FIGURE 8 is a perspective view of a modified form of anchor construction for a clutch band of the present invention;
FIGURE 9 is a perspective view of another modified form of anchor construction for a clutch band of the present invention;
FIGURE 10 is a detail cross-sectional view of the anchor construction of FIGURE 9 with the view being taken substantially along the line 10—10 of FIGURE 9 looking in the direction indicated by the arrows;
FIGURE 11 is a view along the lines of FIGURE 2 but showing the clutch band of FIGURES 9 and 10 embodied in a clutch; and
FIGURE 12 is a plan view of one of the clutch bands of FIGURE 11 prior to forming of the band into a generally spiral configuration.

Referring now to FIGURES 1 and 2 of the drawings, there is shown a clutch having known drive and driven clutch members 5 and 6, respectively, in an arrangement conventionally employed with automotive starter motors, and with which clutch band means, generally indicated at 7, of the present invention has been incorporated. It will be understood that the present invention is not limited to clutch bands for such starter motors but may be employed in any clutch arrangement having drive and driven parts or members, as, for example, between the stator and impeller of a fluid torque converter upon appropriate formation of the clutch parts in a manner to be described and as shown by way of example in the aforementioned United States Patent No. 2,518,453.

In the clutch shown in FIGURES 1 and 2, the clutch member 5 is in the form of a drive shaft having connection, for example, with an electric motor, and the clutch member 6 has a pinion 3 fast thereto for meshing engagement with a ring gear 4 of a fly wheel of an internal combustion engine. The drive member 5 has an annular flange 9 at the outer end thereof and within which the inner end of the driven member 6 is arranged in piloting relation. A thrust washer 10 engages the outer end of the annular flange 9 and end wall 12 of driven member 6 and is retained in position by a sheet metal housing 14 enclosing the clutch by the radially inwardly extending end flanges 16 and 17. The end flange 16 forms a seat for one end of a coil spring 18 as in a conventional starter clutch.

The driven clutch member 6 as disclosed in the aforementioned United States patent is formed with a V-groove 19 defined by opposed end walls 20 and 21 tapering inwardly toward each other and a bottom wall 22 for receiving the band means 7 which, in the embodiment of the invention shown, comprises four tapered bands 23, 24, 25 and 26 of generally spiral configuration, the terminal ends of greatest width having anchors 27 thereat, and with their narrow free ends extending into the V-groove 19. The bands 23 through 26 perferably are constructed of spring steel stock of uniform thickness, and as will be described in greater detail hereinafter, effect a biasing force urging the side edges of the bands into wedging engagement with the walls 20 and 21 of V-groove 19. The anchors 27 fit into pockets 28 formed by cut-outs in the annular flange 9 of the drive member 5, and in the clutch shown in FIGURES 1 and 2 there are four of such pockets disposed in uniform circumferentially spaced relation in the annular flange to receive the anchors 27 of the four bands 23 through 26.

In that the several clutch bands 23 through 26 are of identical construction reference hereinafter will be made only to band 23. As previously noted the anchor end 27 of band 23 fits in pocket 28 of the drive member 5 and has a clutch release face 30 at its outer end and a clutch drive face 32 at its inner end which faces 30 and 32 engage end walls 33 and 34, respectively, of the pocket 28.

In the clutch described, upon rotation of the drive member 5 in a counter-clockwise direction, as indicated by the arrow, the end wall 34 of the pocket 28 engages the drive face 32 of the anchor 27 which effects radical contraction of the band 23 to engage the side edges thereof with the walls 20 and 21 of the V-shaped groove 19 to drive the driven member 6 in a counterclockwise direction as indicated by the arrow applied to the latter. However, when the driven member 6 overruns the drive member 5, the releasing face 30 by its engagement with the end wall 33 of the pocket 28 effects release of the frictional driving engagement of the side edges of the band 23 with the walls 20 and 21 of the V-groove 19 to thus drivingly disengage the drive and driven clutch members. Thus, in the arrangement of the parts as shown, when the driven member 6 is rotating in the same direction but at a faster speed than the drive member 5, the driven member 6 overruns the drive member 5. The mode of operation of the clutch bands in association with the drive and driven members of the clutch are further described in the aforementioned Dodwell patent and to which reference may be had. Also, in this regard, reference may be has to United States Patent No. 2,895,577, dated July 21, 1959, to John M. Dodwell for further discussion and explanation of the manner of effecting driving and overrunning of the clutch parts in the general assembly and arrangement of parts as above described.

As above noted, the present invention relates to an improvement in clutch bands, such as shown at 23 through 26, and reference may now be had to FIGURES 3 through 7 for a detail description thereof. In FIGURE 5 there is shown a clutch band, for example, the band 23 having the anchor 27 at the terminal end thereof of maximum width and which band, as will be described, is curved in generally spiral form as shown in FIGURE 3 for assembly with drive and driven parts 5 and 6 of a clutch. The anchor 27 comprises an outer end portion 35 disposed in superimposed relation with respect to an adjacent inner end portion 36 and which outer and inner end portions are connected by transverse end fold 38 of generally tubular configuration to define a transversely extending opening 39. The fold 38 is of a height in excess of twice the thickness of the metal from which the band is formed. The outer end portion 35 is of arcuate configuration in transverse cross section, and is disposed with its concave surface 40 facing the opposed upper surface of the inner end portion 36. The side edges 42—42 of the outer end portion 35 are secured, as by brazing, adjacent and slightly inwardly of the side edges of the lower end portion 36 due to the taper of the band. The arcuate transverse configuration of the upper end portion 35 together with the lower end portion 36 define a channel 44 extending from the inner end or drive face 32 of the anchor 27 to the transverse opening 39 formed by the end fold 38. By reason of the end fold 38 and the arcuate transverse cross-section of the upper end portion 35 releasing and driving faces 30 and 32 of substantial height are provided. In the operation of the clutch and upon wear of the side edges of the spring bands in engaging the side walls 20 and 21 of the groove 19, the bands move radially inwardly of the V-groove 19, but the clutch release and drive faces being of substantial height as noted, accommodate substantial wearing away of the side edges of the bands without interfering with proper operation of the clutch.

Referring now to FIGURE 8 there is shown a modified form of anchor end 27' for a spring band, it being the same in all respects as that previously described, but supplemented by the provision of an abutment member 46 mounted at the inner end of the outer end portion 35' and of a height substantially equal to the height of the fold 38' to provide a drive face of substantial area for engagement with the drive face of the anchor pocket in the clutch drive member 5. The closure member 46 may be secured in any suitable manner as by brazing to the inner end of the outer end portion 35'.

In FIGURE 11 there is shown a clutch much along the lines of FIGURE 2 embodying a plurality of clutch bands 47, 48, 49 and 50 each having an end anchor structure as shown in detail in FIGURES 9 and 10. The several bands 47 through 50 are of like construction in view of which the description of band 47 and the anchor end thereof as shown in FIGURES 9 and 10 is believed to be sufficient for purposes of the present application. The band 47 like band 23 of FIGURES 1 and 2 is formed with an anchor 27" at the terminal end thereof of maximum width and which band is curved in generally spiral form as shown in FIGURE 11 for assembly with drive and driven parts 5' and 6', respectively, of a clutch. The band constructions of FIGURES 8 and 9 have particular utility for use in torque converters in which the drive part 5' may comprise an impeller and the driven part 6' a stator of the converter. The anchor 27" like the anchors 27 and 27' of the bands of FIGURES 6 and 8, respectively, comprises an outer end portion 35" disposed in superimposed relation with respect to an adjacent inner end portion 36" and which outer and inner end portions are connected by a transverse end fold 38" of generally tubular configuration to define a transversely extending opening 39". As before the fold 38" is of a height in excess of twice the thickness of the metal from which the band is formed. The outer end portion 35" of the band of FIGURE 9 further comprises an intermediate portion 52 and an outermost end portion 53 between which a transverse hollow abutment or hump 54 is formed. The abutment 54 is of a height substantially equal to the height of end fold 38" and provides a driving face 55. The inner surfaces of the intermediate portion 52 and outermost end portion 53 have surface to surface facing relation with the adjacent outer surface portions of the inner end portion 36". The inner end portion 36" as shown lying immediately below the hollow abutment 54 may be stamped to provide an opening through the inner end portion 36" with lateral flanges or lugs 57 extending into the transverse opening 58 of the abutment 54 serving to reinforce the latter. It is preferable that the thickness of the outer end portion 35" in the formation thereof as above described be maintained of uniform thickness so as to prevent the creation of weakened areas or places where fracture may be likely to occur.

The assembly of the four clutch bands 47, 48, 49 and 50 in the clutch structure of FIGURE 11 is such that the anchors 27" fit into pockets 28' formed by cut-outs in the annular flange 9' of clutch drive member 5' and as before there are four such pockets disposed in uniform circumferentially spaced relation in the annular flange 9' to receive the anchors 27" of the four bands 47 through 50. The narrowing free ends of the several bands extend, as before, into a V-groove of the driven part 6'. It will be noted that the annular flange 9' of drive member 5' is provided with a recess 60 for receiving the outermost end portions 53 of the anchor ends of the several bands. The clutch constructed as noted functions in the manner of the clutch already described in that upon rotation of drive member 5' in a counterclockwise direction, as indicated by the arrow, the end wall 34' of the pocket 28' engages the drive face 55 of the anchor 27" which effects radial contraction of the bands to engage the side edges thereof with the walls of the V-shaped groove formed in the driven member to drive the latter in a counterclockwise direction as indicated by the arrow applied to the latter. However, when the driven member 6' overruns the drive member 5' releasing face 38' of the pocket 28' effects release of the frictional driving engagement of the side edges of the bands 47 through 50 with the walls of the V-shaped groove in the driven clutch member 6'.

In the constructions of FIGURES 8 and 9, driving faces 46 and 55, respectively, provide substantial contact area and have particular utility for application in torque converters in which the components are frequently made of light and mechanically weak metals such as aluminum and in which large area contact is thus desirable to take the loads involved.

It is preferably in fabricating clutch bands of the present invention to form them from high carbon flat steel stock of, for example, 1095 or 1075 steel. An appropriate length of such stock and preferably of uniform thickness is cut from the supply source and then tapered from one terminal end to the other as before described. After tapering of the stock, the edges may be coined and provided with a bevel. The anchors 27, 27' and 27" are then suitably formed at the terminal end of greatest width, for example, in FIGURES 5 and 12 by known metal working expedients as previously described and preferably in the formation of the anchors, the thickness of the metal is maintained so that the outer end portions 35, 35' or 35" and the inner end portions 36, 36' or 36" and the folds 38, 38' and 38", respectively, are of metal of the same thickness. The bands are then wound on a suitable form into a general spiral configuration as illustrated, for example, in FIGURE 3. After spirally forming the bands of FIGURES 6 and 8 suitable brazing material is inserted between the upper end portions 35 or 35' and the inner end portions 36 or 36' and particularly at the lower surface of side edges 42 or 42' of the upper end portions 35 or 35', respectively. In the form of the clutch band of FIGURES 9 and 10 the brazing material is inserted between the inner surfaces of the intermediate portion 52 and outermost end portion 53 of the upper end portion 35" and the adjacent outer surfaces of the inner end portion 36". Brazing material such as silver solder may be employed which has a brazing temperature of about 1200° F. but which material is capable of withstanding temperatures up to 1700 to 1800° F. Thereafter, the assembly is heat treated at a temperature in the range of about 1400–1550° F. which temperature it will be observed will effect brazing of the brazing material to secure the outer end portions 35, 35' or 35" to the adjacent inner portions 36, 36' or 36", respectively. Thereafter, the bands are quenched in oil at room temperature following which they are stressed relieved in a temperature range of about 400°–500° F. After such heat treatment, quenching and stress relieving the bands are then preferably accurately shaped to the desired spiral configuration following which the bands are heat set at a temperature of about 650° to 750° F. depending in large part on the hardness desired. The bands thus completed may be assembled with other like bands as, for example, bands 23 through 27 with the other components of FIGURES 1 and 2 of the drawings to provide the clutch there shown, or bands 47 through 50 may be incorporated with the other parts shown in FIGURE 11 to complete the clutch there shown.

It is important to note that by maintaining the several elements of the bands of substantially the same thickness, and the formation of the folds 38, 38' and 38" and the openings 39, 39' and 39" provided by the folds, together with the arcuate transverse cross-section of the upper end portion 35 or 35' and the channel 44 or 44' formed thereby of the bands of FIGURES 7 and 8, as well as the fold 38" and opening 39" therethrough and transverse opening 58 of abutment 54 of the band of FIGURE 9 enables uniform heating and quenching of the clutch bands so that the latter will have a long life and will not be subject to easy fracture.

While certain preferred embodiments of the invention have been disclosed, it will be understood that various modifications and rearrangements may be made therein without departing from the spirit and scope of the invention.

The invention claimed is:

1. The method of making a clutch band comprising the steps of forming an outer end portion of the terminal end of a strip of flat spring steel into arcuate transverse cross-sectional configuration and of a thickness substantially equal to the thickness of said strip, forming a fold of tubular configuration and of a thickness substantially equal to the thickness of said strip between said outer end portion and the adjacent inner portion of said strip with the concave side of said outer end portion opposite the outer face of said inner end portion, forming said strip into generally spiral shape, securing the side edges of said outer end portion to said inner end portion, and thereby provide an anchor at said terminal end having an opening through said fold extending transversely of and at the outer end of said anchor and a channel extending from the inner end of said outer end portion to the opening in said fold, heat treating said formed strip, quenching said formed strip, stress relieving said formed strip, reshaping said formed strip into spiral configuration, and heat setting said reshaped strip.

2. The method of claim 1 in which said strip is of high carbon steel, in which brazing material for securing said side edges of said outer end portion to said inner end portion is characterized by having a brazing temperature of about 1200° F., in which said heat treating temperature is in a range of about 1400° to 1550° F., in which said quenching is in oil at room temperature, in which said stress relieving is at a temperature in a range of about 400° F. to 500° F., and said heat setting temperature is in a range of about 650° F. to 750° F.

3. The method of making a clutch band comprising the steps of superimposing an outer end portion of the terminal end of a strip of flat spring steel over an inner end portion to provide a fold of tubular configuration and of a thickness substantially equal to the thickness of said strip between said outer end portion and the inner portion of said strip and of a height in excess of twice the thickness of said strip to thereby provide an anchor at said terminal end having an opening through said fold extending transversely of and at the outer end of said anchor, heat treating said formed strip, quenching said formed strip, stress relieving said formed strip, shaping said formed strip into spiral configuration, and heat setting said shaped strip.

References Cited by the Examiner

UNITED STATES PATENTS

| | | | |
|---|---|---|---|
| 2,668,347 | 2/1954 | Gorske | 29—173 |
| 2,895,577 | 7/1959 | Dodwell | 192—41 |
| 2,922,220 | 1/1960 | Sacchini | 29—173 |
| 3,117,660 | 1/1964 | Dodwell | 192—41 |

JOHN F. CAMPBELL, *Primary Examiner.*

DAVID J. WILLIAMOWSKY, THOMAS H. EAGER, *Examiners.*